(12) United States Patent
Murray et al.

(10) Patent No.: US 8,572,992 B2
(45) Date of Patent: Nov. 5, 2013

(54) METHOD FOR RECOVERY AND RECHARGE OF BLEND REFRIGERANTS WITH BLEND SENT FOR RECLAMATION

(75) Inventors: Gary Murray, Montpelier, OH (US); Mark McMasters, Owatonna, MN (US); William Brown, Owatonna, MN (US)

(73) Assignee: Service Solutions U.S. LLC, Warren, MI (US)

( * ) Notice: Subject to any disclaimer, the term of this patent is extended or adjusted under 35 U.S.C. 154(b) by 1037 days.

(21) Appl. No.: 12/059,715

(22) Filed: Mar. 31, 2008

(65) Prior Publication Data
US 2009/0241560 A1 Oct. 1, 2009

(51) Int. Cl.
F25B 45/00 (2006.01)
(52) U.S. Cl.
USPC .............................. 62/149; 62/292
(58) Field of Classification Search
USPC ............................ 62/77, 292, 149
See application file for complete search history.

(56) References Cited

U.S. PATENT DOCUMENTS

| | | | | |
|---|---|---|---|---|
| 4,193,781 A * | 3/1980 | Vogel et al. | ...................... | 62/81 |
| 5,138,847 A * | 8/1992 | Rollins | ........................ | 62/292 |
| 5,226,300 A * | 7/1993 | Christensen et al. | ............ | 62/77 |
| 5,371,019 A * | 12/1994 | Manz et al. | ................... | 436/126 |
| 5,493,869 A * | 2/1996 | Shirley et al. | .................. | 62/149 |
| 5,514,595 A * | 5/1996 | Olds et al. | ..................... | 436/126 |
| 5,564,280 A * | 10/1996 | Schilling et al. | ................ | 62/84 |
| 5,758,506 A * | 6/1998 | Hancock et al. | ................. | 62/77 |
| 6,134,896 A | 10/2000 | Brown et al. | | |
| 6,185,945 B1 * | 2/2001 | Pfefferle et al. | .............. | 62/149 |

* cited by examiner

*Primary Examiner* — Brandon M Rosati
*Assistant Examiner* — Orlando E Aviles Bosques
(74) *Attorney, Agent, or Firm* — Baker & Hostetler LLP

(57) ABSTRACT

A refrigerant recovery unit that diverts blended refrigerant withdrawn out of a refrigerant system to an external tank outside the refrigerant recovery unit for reclamation includes a recovery circuit coupled on one end to the refrigerant system and coupled on another end to the external tank, a controller in communication with the recovery circuit for controlling a transfer of the refrigerant withdrawn from the refrigerant system to the external tank, and a valve operatively engaged with the controller and the recovery circuit and operable to transfer the refrigerant withdrawn from the refrigerant system to the external tank for recycling or reclamation.

12 Claims, 4 Drawing Sheets

METHOD FOR RECOVERY AND RECHARGE OF BLEND REFRIGERANTS WITH BLEND SENT FOR RECLAMATION

FIELD OF THE INVENTION

The disclosure relates generally to automotive vehicle air conditioning systems, and more specifically to refrigerant recovery units that can recover blended refrigerant from an automotive vehicle air conditioning (hereinafter "A/C") system for recycling.

BACKGROUND OF THE INVENTION

Automotive vehicle A/C systems require maintenance. Maintenance includes refrigerant recovery, evacuation and recharging of the A/C system. Portable refrigerant recovery units are used in connection with this maintenance. The refrigerant recovery units connect to the A/C system of the automotive vehicle to recover refrigerant out of the system, separate out contaminants and oil, and recharge the system with additional refrigerant. During service it is desirable to recover, recycle or reclaim the refrigerant.

SUMMARY OF THE INVENTION

At least one embodiment of the disclosure is a refrigerant recovery unit having an external tank outside the refrigerant recovery unit for reclamation, comprising: a recovery circuit coupled on one end to the refrigerant system and coupled on another end to the external tank; a controller in communication with the recovery circuit for controlling a transfer of the refrigerant withdrawn from the refrigerant system to the external tank; and a diversion valve operatively engaged with the controller and said recovery circuit and operable to transfer the refrigerant withdrawn from the refrigerant system to the external tank in response to a signal from the controller.

Other embodiments provide a method for using a refrigerant recovery unit having a storage tank external to the refrigerant recovery unit, comprising: coupling the refrigerant recovery unit in fluid communication with the refrigerant system; receiving a stream of refrigerant from the refrigerant system into the refrigerant recovery unit; passing the refrigerant stream continuously through a refrigerant circuit in the refrigerant recovery unit; and transferring the refrigerant stream into the external storage tank.

Still other embodiments show a refrigerant recovery unit having an external tank outside the refrigerant recovery unit for reclamation, comprising: a recovery circuit coupled on one end to the refrigerant system and coupled on another end to the external tank; a controller in communication with the recovery circuit for controlling a transfer of the refrigerant withdrawn from the refrigerant system to the external tank; and a means for diverting operatively engaged with the controller and the recovery circuit and operable to transfer the refrigerant withdrawn from the refrigerant system to the external tank in response to a signal from the controller.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
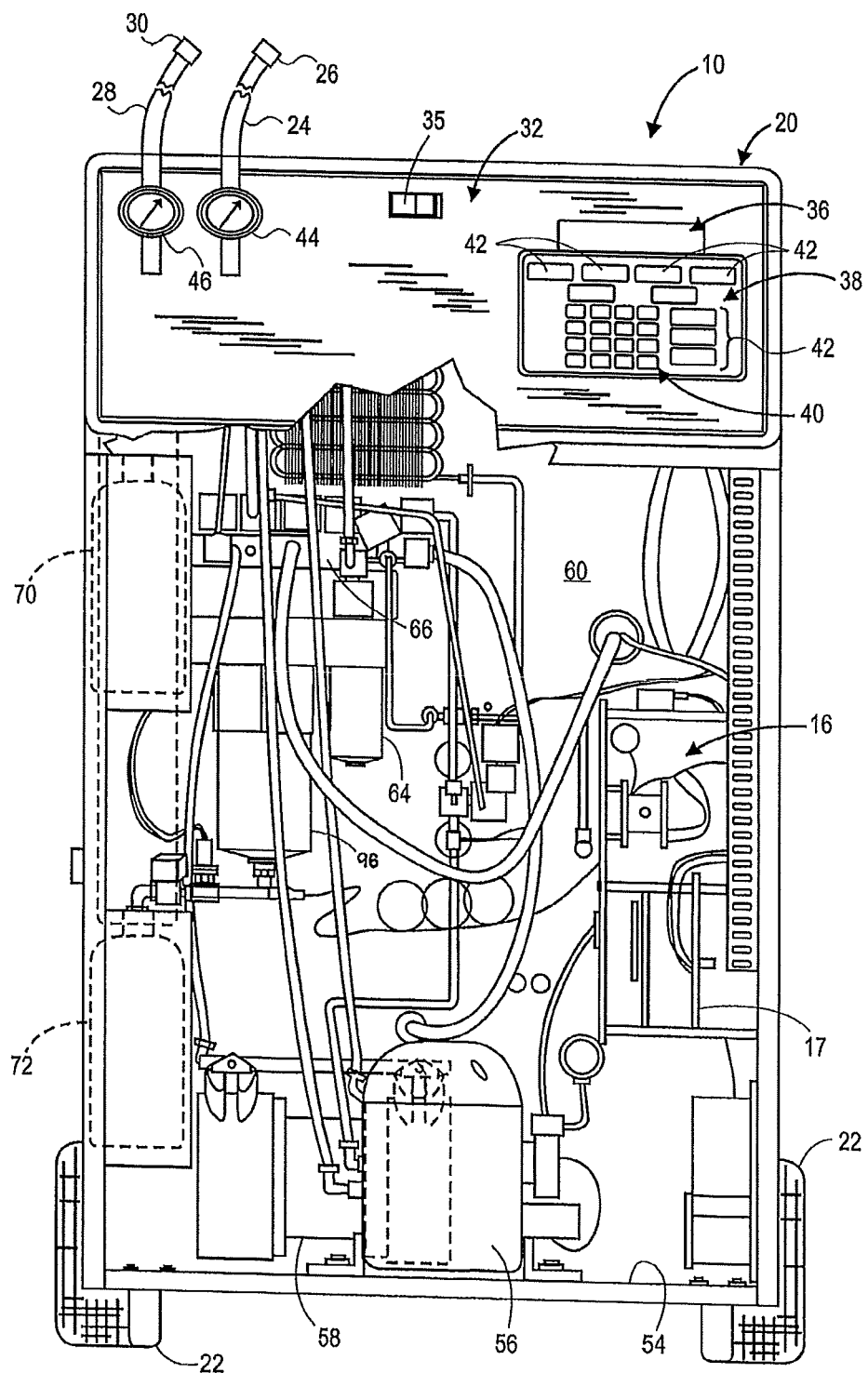
FIG. 1 is a fragmentary front plan view of an example refrigerant recovery unit shown with a portion of the front cover removed to illustrate major components of the unit.
Figure 2:
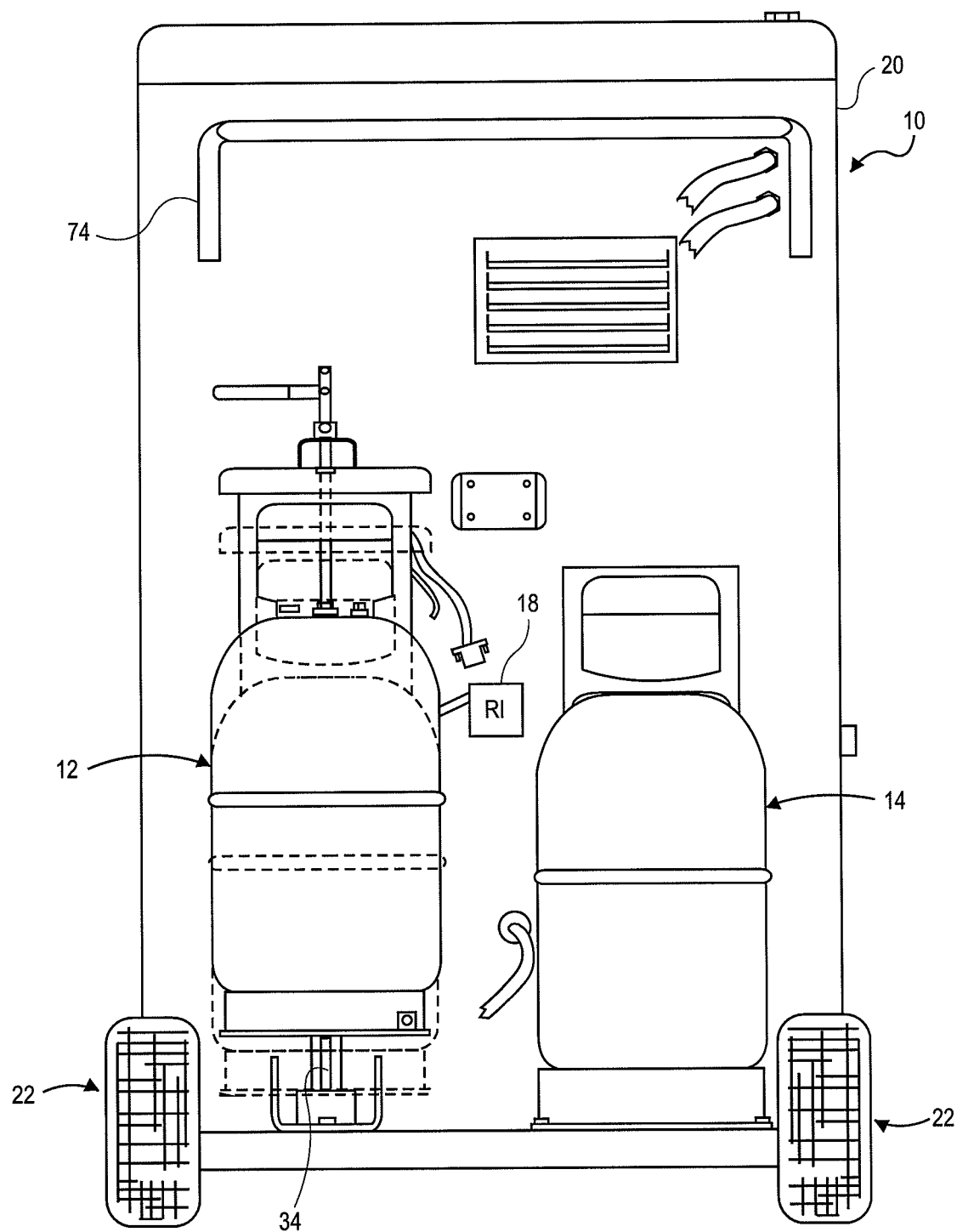
FIG. 2 is a fragmentary rear plan view of the refrigerant recovery unit shown in FIG. 1.

The invention will now be described with reference to the drawing figures, in which like numerals refer to like parts throughout. FIGS. 1-2 generally show one example of a portable recovery unit 10 for recovering and recycling refrigerant from a refrigerant system, such as in an automotive vehicle. The refrigerant recovery unit 10 is a machine mounted within a cabinet 20 supported by a pair of wheels 22, for portability. The unit 10 includes a first container or main tank 12 for holding a primary supply of refrigerant. The main tank 12 may also be referred to as an internal storage vessel (ISV). The primary supply of refrigerant or recovered refrigerant contains refrigerant that has been recovered from the A/C system. The unit 10 also includes a second container or auxiliary tank 14 for holding a secondary supply of refrigerant. The secondary supply of refrigerant has a known chemical composition, and is sometimes referred to as fresh refrigerant, virgin refrigerant or recharging refrigerant. The auxiliary tank 14 is arranged in fluid communication with the main tank 12 so fresh refrigerant can be transferred from the auxiliary tank 14 to the main tank 12. An electronic controller 16 controls the transfer of refrigerant from the auxiliary tank 14 to the main tank 12 based on refrigerant composition or purity level.

More specifically, the electronic controller 16 including a microprocessor on a circuit board 17 for controlling an electromechanical solenoid valve, including solenoid valves 134 and 135. Optionally, the controller may include a memory unit to store software and data, and the microprocessor may be coupled to the memory unit for executing the software stored in the memory unit. The electronic controller receives data signals from the pressure sensors and control switches on the control panel 32, as well as from a composition analyzing device 18, and a weighing device 34.

The composition analyzing device 18 may be an infrared analyzing device, for example, which analyzes the refrigerant composition with gas chromatography, although this is not the only way the refrigerant can be sampled. The composition analyzing device 18 may be operatively engaged with the controller 16 and the main tank 12 or any other suitable element in the recovery circuit, such as conduit leading to valves 134 and 135 so that based on information received from the device 18, the refrigerant may be diverted to the main tank 12 or the external tank 11 based upon the detected purity level.

The weighing device 34 in the example embodiment is a load cell, but the weighing device can be an electronic scale or any other type of weighing device configurable to transmit a weight data signal to the controller 16. As shown in FIG. 2, the main tank 12 rests on the weighing device 34. The weighing device 34 provides a weight data signal to the controller 16 such that the weight of the tank comprising its tare weight plus the weight of refrigerant therein is monitored by the controller 16.

The control panel 32 includes an on/off switch 35 and a display 36 for displaying the operational status of the machine's operation. The display may be an LCD display or other suitable electronic display that is coupled to the controller 16 by way of a conventional input/output circuit. The display panel 30 further includes a switch panel 38 having a conventional keyboard 40, and a plurality of push-button switches 42 for controlling the operation of the unit 10 through its various phases of operation and/or for selecting parameters for display. The keyboard 40 in conjunction with operational switches 42 and display 36 allow the operator to enter the desired operational parameters for the unit 10 according to manufacturer specifications for the servicing of an A/C system in a particular vehicle.

The refrigerant recovery unit 10 may include a high pressure hose 24, typically color coded red, with a coupling 26 for coupling to the vehicle's high pressure port and a low pressure hose 28, typically color coded blue, having a coupling 30 for coupling to the low pressure port of the vehicle's refrigerant circuit. In some refrigerant systems, there may be only one port, for example, where the recovery or low pressure port is eliminated. In such systems, the refrigerant recovery unit may be configured with one hose, in accordance with the principles of the invention. The front panel of the cabinet 20 is shown broken away in FIG. 1 to show the major elements of the refrigerant recovery unit 10. The input hoses 24 and 28 are coupled to mechanical pressure gauges 44 and 46, respectively, which are mounted on the front panel of refrigerant recovery unit 10, as seen in FIG. 1. In addition, electrical pressure transducers may be coupled to the hoses 24 and 28, respectively, and to the controller 16 through conventional input/output circuits to provide the controller 16 with pressure information during operation of the unit 10. Gauges 44 and 46 provide the operator with a conventional analog display of the pressure as well. In accordance with other aspects of the present invention, a sight gauge (not shown), which may include an integral replaceable filter cartridge, for example, may be mounted to the cabinet 20 for filtering particulate material from the refrigerant during the flushing cycle.

Mounted to the floor 54 of cabinet 20 is a compressor 56 and a vacuum pump 58. Behind the front of cabinet 20 on floor 54, is mounted the main tank 12 of refrigerant (FIG. 2) for the supply of refrigerant to the system being serviced. Also mounted adjacent the main tank 12 is the auxiliary supply tank 14 which supplies additional refrigerant to the main tank 12. High pressure hoses and connectors together with control valves couple tank 14 to tank 12.

Mounted to the inside of rear wall 60 of cabinet 20 is an oil separator 62 and a compressor oil separator filter 96. In addition, a fresh oil canister 70 is mounted within a side compartment of cabinet 20. A recovery oil container 72 is mounted on the lower part of the cabinet 20 to receive oil drained from the oil separator 62. Refrigerant recovery unit 10 also includes a handle 74 to facilitate portability of the refrigerant recovery unit 10.

Figures 1, 3:
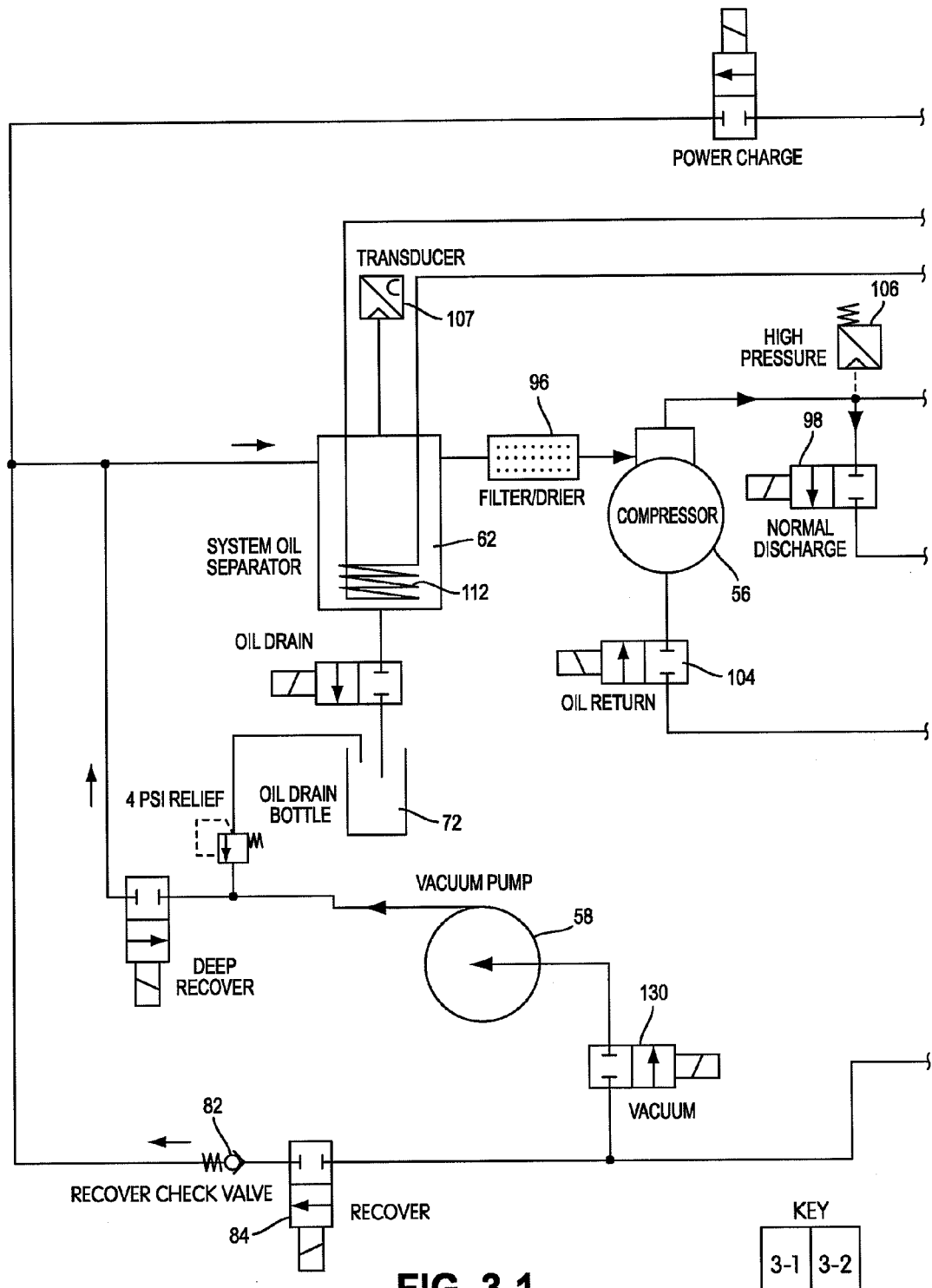
FIG. 3 is a flow diagram of the refrigerant recovery unit shown in FIGS. 1 and 2.
Figures 2, 3:
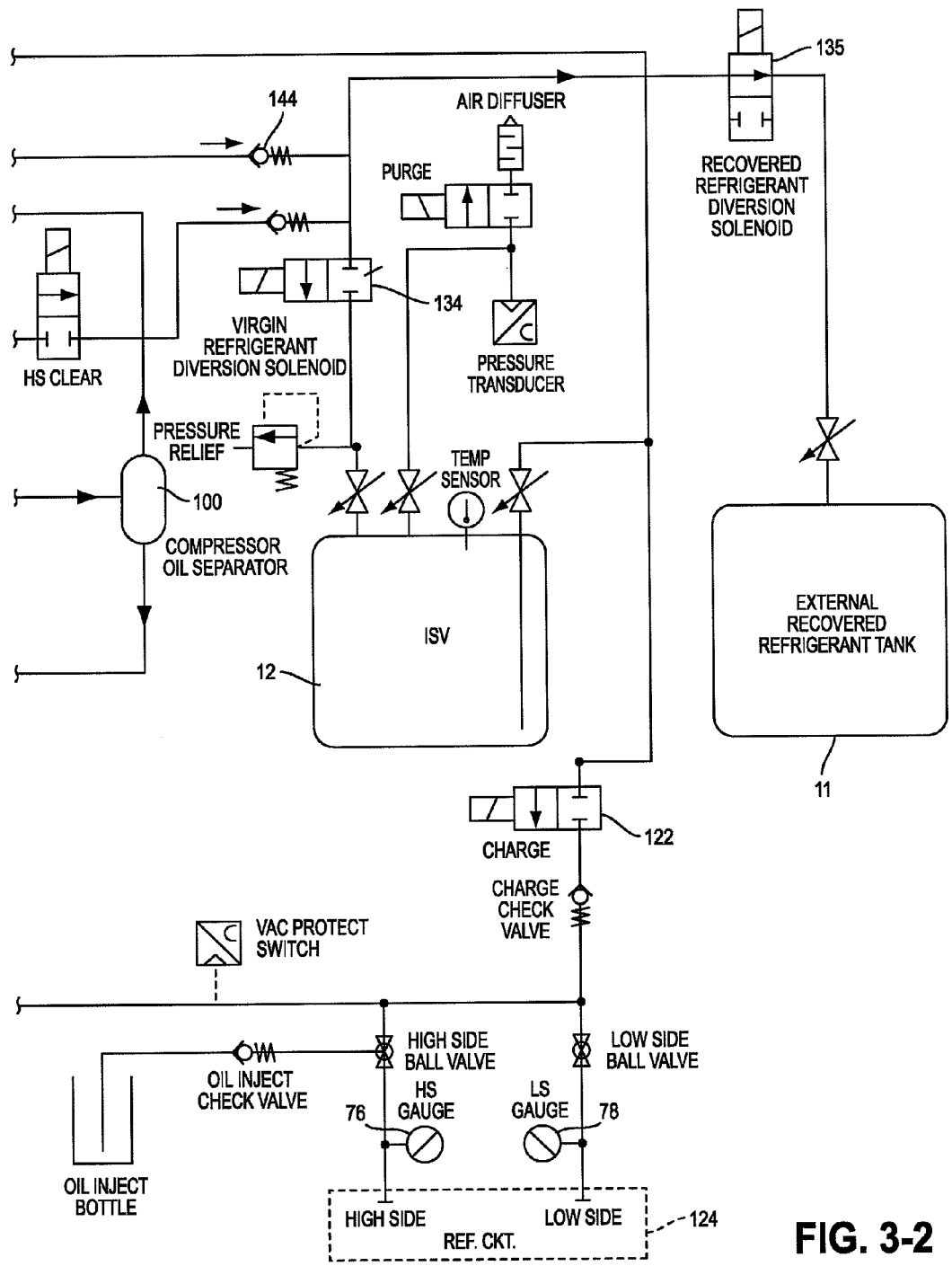

Having briefly described the major components of the refrigerant recovery unit 10 shown in FIGS. 1 and 2, a more detailed description of the structure and operation of the example refrigerant recovery cart 10 follows in connection with a discussion of FIG. 3.

With respect to a recovery process, one example of a recovery circuit is described below and shown in FIG. 3. To recover refrigerant, initially, hoses 24 and 28 are coupled to the vehicle 124 and the recovery cycle is initiated by the opening of the dual back-to-back high pressure and low pressure solenoids 76, 78, respectively. This allows the refrigerant within the vehicle to flow through recovery valve 84 and check valve 82. The refrigerant then flows into a system oil separator 62 where it travels through a filter/dryer 96 to an input of compressor 56. Refrigerant is drawn through the compressor 56 through a normal discharge solenoid 98 and through the compressor oil separator 100, which circulates oil back to the compressor 56, through an oil return valve 104. The refrigerant recovery unit 10 may optionally include a high pressure switch 106. Transducer 107 is coupled to the microprocessor which is programmed to determine the upper pressure limit of, for example, 435 psi to shut down the compressor 56 in the event the pressure becomes excessive. The compressed refrigerant exits the oil separator 100 and then through a heating coil 112 in the system oil separator 62. Optionally, if a purging of the system is desired, a high-side clear solenoid ("HS Clear" shown in FIG. 3) may be actuated to release the recovered refrigerant transferred from compressor 56 directly into the main tank 12 instead of through the normal discharge solenoid 98.

To continue, the heated compressed refrigerant flows through heating coil 112 and assists in maintaining the temperature in the system oil separator 62 within a working range. Optionally, the refrigerant recovery unit 10 may include a low pressure switch or pressure transducer 107, for example, coupled to the system oil separator 62 that senses pressure information and provides an output signal coupled to the microprocessor through a suitable interface circuit programmed to detect when the pressure has recovered refrigerant down to 13 inches of mercury.

The refrigerant is further transferred through a loop of conduit, for example, associated with the system oil separator 62, for cooling or condensing. Finally, the recovered refrigerant flows through check valve 144 and into the main tank 12, if the controller 16 determines that the recovered refrigerant meets an acceptable purity level. The controller 16 detects the purity level through information or communication exchange with the associated refrigerant identifier 18. Alternatively, if the recovered refrigerant does not meet the acceptable purity level or if the controller 16 determines that a user has selected that the recovered refrigerant should be diverted to an external tank 11, the recovered refrigerant is diverted to the external storage tank 11, as will be discussed further below.

The evacuation cycle begins by the opening of solenoids 76 and 78 and valve 130, leading to the input of a vacuum pump 58. Prior to opening valve 130, an air intake valve (not shown) is opened, allowing the vacuum pump 58 to start up exhausting air. The vehicle system 124 is then evacuated by the closing of the air intake valve and the opening of valve 130, allowing the vacuum pump 58 to exhaust any trace gases remaining until the pressure is approximately 29 inches of mercury. When this occurs, as detected by pressure transducers optionally coupled to the high side and low side of the system 124 and to the controller 16, the controller 16 actuates valve 130 by turning it off and the recharging cycle begins.

The recharging cycle begins by opening charge valve 122 and solenoid 76 to allow the liquid refrigerant in tank 12, which is at a pressure of approximately 70 psi or above, to flow through the high side of the system 124. The flow is through high-pressure solenoids 76 for a period of time programmed to provide a full charge of refrigerant to the vehicle.

The reclaiming of the recovered blend refrigerant will now be described in more detail with further reference to FIG. 3. In the example embodiment shown in FIG. 3, the refrigerant recovery cart 10 may be provided with an optional means for diverting the recovered refrigerant either to an internal tank or an external tank. Specifically, the refrigerant recovery cart may be provided with a diversion circuit generally consisting of two flow control solenoids 134, 135. The two flow control solenoids are configured and arranged to work independently from each other.

As discussed above, the main tank 12 is for the purpose of recharge and can be filled by transferring fresh refrigerant into main tank 12. When the controller 16 determines that fresh refrigerant is required in main tank 12, the controller acts to open the flow control solenoid 134 to transfer fresh refrigerant from the auxiliary tank 14 into the main tank 12 to have sufficient refrigerant available for charging the refrigerant system 124. When sufficient refrigerant has been transferred into the main tank 12, the controller 16 acts to close the solenoid valve 134. This transfer of refrigerant would happen, for example, when the controller 16 determines that the main tank 12 is empty. Optionally, a low pressure sensor switch may be constructed and arranged to send a signal to the microprocessor providing an alarm signal to the operator indicating when the auxiliary supply tank 14 is emptied and being pulled into a vacuum. When this occurs, sufficient refrigeration exists in main tank 12 to allow completion of a recharging cycle of the refrigerant circuit, and also allow the operator to reconnect a fresh auxiliary tank 14, as required. For such a purpose, it is understood that tank 14, which can be of a conventional design, includes having a shut-off valve for coupling thereto.

The main tank 12, however, can also be used to collect recovered refrigerant blend that is of a purity level that does not need to be reclaimed. The purity level is important for blended refrigerants. Blended refrigerant has multiple chemical components that will separate when they leak from an A/C system or are recovered; that is, one component will bleed off more than another due to the different densities of the components. If the purity level is acceptable, it will fall within a target range of a refrigerant composition, and will not need to be reclaimed. The target composition may be in terms of a defined percentage by weight composition of an ideal composition of the blended refrigerant, for example. When the controller 16 determines that "recover" is selected from the control panel 32, the controller 16 may act to discharge the recovered refrigerant blend into the main tank 12, that is if through communication with the associated refrigerant identifier 18, the controller 16 determines that the recovered refrigerant blend meets the acceptable purity level.

However, if the recovered refrigerant blend does not meet the acceptable purity level or if the controller 16 determines that a user has selected that the recovered refrigerant should be diverted to an external tank, the controller 16 operates to divert the recovered refrigerant blend to the external storage tank 11 for later removal and sending away for reclamation.

More specifically, the controller 16 acts to open the flow control solenoid or diversion solenoid 135 to discharge the recovered refrigerant blend through check valve 144, through flow control solenoid 135, and into the external storage tank 11. The external storage tank 11 may be a container configured for transportation, such as a transportable DOT container. This discharge may be through conduit or tubing, for example, provided between the recovery circuit of the refrigerant recovery cart 10 and the external storage tank 11. The conduit is preferably coupled to the external storage tank 11 in such a manner that the external storage tank 11 may be easily and/or quickly disconnected from the refrigerant recovery unit 10. After the recovered refrigerant blend has been transferred to the external storage tank 11, the controller 16 acts to close the flow control solenoid 135. At this point, the external storage tank 11 may optionally be disconnected from the refrigerant recovery unit 10, and be sent off-site to be reclaimed.

In addition, the external storage tank 11 may be configured with a system for monitoring the fill level of the tank so that the tank 11 is not overfilled. For example, the external storage tank 11 may be provided with a float level switch (not shown) or other suitable device to monitor the tank fill level. Upon filling the external storage tank 11 with the recovered refrigerant blend to the desired fill level, the filled external storage tank 11 may then be disconnected from the refrigerant recovery unit 10, and be sent off-site to be reclaimed.

Thus, with the system of the present invention, a refrigerant recovery unit 10 is equipped to recover and recycle or reclaim the recovered refrigerant blend, which assures uninterrupted servicing of a refrigerant system of a vehicle or other system being serviced.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A refrigerant recovery unit for recharge and reclamation of a refrigerant, the refrigerant recovery unit comprising:
   a main tank;
   an auxiliary tank in fluid communication with the main tank and containing virgin refrigerant for supplying to the main tank;
   an external tank;
   a recovery circuit configured to be coupled on one end to a refrigerant system of a vehicle, the recovery circuit including a compressor and a high-side solenoid; wherein the high-side solenoid is located on a refrigerant pipe downstream of the compressor and said refrigerant pipe and high-side solenoid valve are in parallel with a second refrigerant pipe comprising a compressor oil separator and a valve coupled downstream the compressor and upstream an inlet of a compressor oil separator;
   a controller in communication with the recovery circuit for controlling a transfer of the refrigerant withdrawn from the refrigerant system;
   a composition analyzing device that determines information about a purity level of the withdrawn refrigerant; and
   a diversion valve operatively engaged with said controller and said recovery circuit;
   wherein the controller is configured to selectively control a transfer of the refrigerant withdrawn from the refrigerant system to one of the main tank and the external tank, via the recovery circuit and the diversion valve, based on the information about the purity level of the withdrawn refrigerant, the withdrawn refrigerant being diverted into the external tank when the purity level is below an acceptable level, and is configured to actuate the high-side solenoid to release withdrawn refrigerant from the compressor directly into the main tank, without passing through the compressor oil separator, during a purging of the recovery circuit.

2. The refrigerant recovery unit according to claim 1, wherein said diversion valve is movable between an open position and a closed position by said controller and operatively engaged with the external tank so that when said diversion valve is in the open position thereof the refrigerant flows from the refrigerant system to the external tank, and when said diversion valve is in the closed position thereof the refrigerant is prevented from flowing from the refrigerant system to the external tank.

3. The refrigerant recovery unit according to claim 2, wherein said diversion valve is a solenoid actuated valve.

4. The refrigerant recovery unit according to claim 1, further comprising a check valve operatively engaged between the refrigerant system and the external tank, wherein the refrigerant flow from the refrigerant system to the external tank is permitted to flow in only one direction.

5. The refrigerant recovery unit according to claim 1, wherein said recovery circuit further includes a recover solenoid coupled to a high pressure side of the refrigerant system.

6. The refrigerant recovery unit according to claim 5, wherein said recovery circuit further includes a system oil separator coupled to said recover solenoid.

7. The refrigerant recovery unit according to claim 6, wherein said recovery circuit further includes a filter coupled to the system oil separator that is a water separating molecular sieve.

8. The refrigerant recovery unit according to claim 7, wherein said recovery circuit further includes the compressor coupled to said filter.

9. The refrigerant recovery unit according to claim 8, wherein said recovery circuit further includes the compressor oil separator coupled to said compressor on an end and to said system oil separator on another end.

10. The refrigerant recovery unit according to claim 9, wherein said recovery circuit further includes an oil return valve coupled between an outlet of said compressor oil separator and said compressor.

11. The refrigerant recovery unit according to claim 9, wherein said system oil separator is coupled to said diversion valve for routing refrigerant leaving said system oil separator into the external tank.

12. The refrigerant recovery unit according to claim 11, further including a check valve coupled between said system oil separator and the external tank.

* * * * *